United States Patent Office 3,037,047
Patented May 29, 1962

---

3,037,047
N-(CARBOXYAMINOALKYL)CARBANILATES
William B. Wright, Jr., Woodcliff Lake, N.J., and Herbert J. Brabander, Pearl River, N.Y., assignors to American Cyanamid Company, New York, N.Y., a corporation of Maine
No Drawing. Filed June 7, 1960, Ser. No. 34,356
13 Claims. (Cl. 260—471)

This invention relates to new organic compounds. More particularly, it relates to new substituted carbanilates and methods of preparing the same.

In the past many substituted carbanilates have been described, however, no compounds have been found which have the structure indicated hereinafter.

The carbanilates of the present invention have the following general formula:

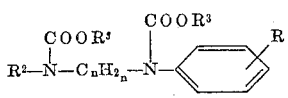

wherein R is a member of the group consisting of hydrogen, halogen, lower alkyl and lower alkoxy radicals, $R^1$, $R^2$ and $R^3$ are lower alkyl radicals and $n$ is an integer of 2 to 3.

The compounds of the present invention are, in general, liquids at room temperature. They are relatively insoluble in water but soluble in most organic solvents such as, for example, alcohols, ethers, esters, ketones, chloroform and the like.

The present compounds can be prepared by several methods which can be described as the reaction of substituted alkylenediamines with a lower alkyl chloroformate. These reactions are illustrated as follows:

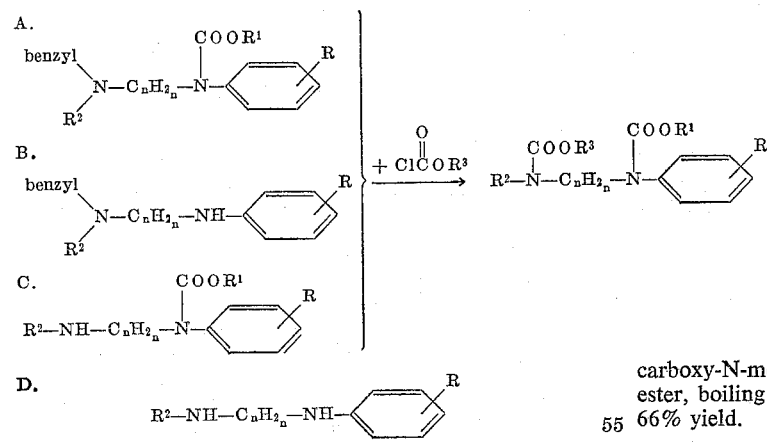

wherein R, $R^1$, $R^2$, $R^3$ and $n$ are as defined above. The illustrated reactions above may be carried out in an inert solvent such as, for example, benzene, toluene, chloroform and the like. The reaction is preferably carried out at a temperature within the range of 10 to 100° C. over a period of time ranging from ½ to 24 hours depending on the intermediate used and the temperature at which the reaction takes place. The higher temperatures are generally required when a benzyl group is to be replaced.

The starting materials in reaction (A) above, N(benzylmethylaminoalkyl)-carbanilates, and also in reaction (B) above, N - (benzylmethylaminoalkyl) - anilines, are described in our copending application Serial No. 6,629, filed February 4, 1960. The starting materials of reaction (C), N-(methylaminoalkyl)-carbanilates, and reaction (D), N-(methylaminoalkyl)-anilines, illustrated above may be prepared by debenzylation of the starting materials of reactions (A) and (B) by the use of hydrogen and palladium carbon catalyst. Also, the preparation of the starting materials in reaction (C), N-(methylaminoalkyl)-carbanilates and those of reaction (D), N-(methylaminoalkyl)-anilines are described in our copending application Serial No. 26,683, filed May 4, 1960.

The compounds of the present invention are physiologically active as central nervous system depressants. For example N-[2-(carboxy-N-methylamino)-ethyl]-p-methoxycarbanilic acid diethyl ester has muscle relaxant properties while N-[2-(N-carboxy-N-methylamino)-ethyl]-p-chlorocarbanilic acid diethyl ester has tranquilizer properties. The present compounds therefore are useful in treating various nervous disorders and, in general, where tranquilizer and muscle relaxant properties have been found of value in the past. These compounds can be administered in the usual pharmaceutical forms such as tablets, capsules, pills and the like. Obviously, they can be combined with various diluents, adsorbents, excipients and other inert ingredients in order to prepare the pharmaceutical preparation.

The following examples illustrate in detail the preparation of the substituted carbanilates of the present invention.

EXAMPLE I

*Preparation of N-[2-(N-Carboxy-N-Methylamino)-Ethyl]-Carbanilic Acid Diethyl Ester*

A solution of 6.3 parts of ethyl N-(2-benzylmethylaminoethyl)-carbanilate and 2.4 parts of ethylchloroformate in 16 parts of dry benzene is heated at reflux for 18 hours and cooled. The reaction mixture is shaken with dilute hydrochloric acid and the layers are separated. The aqueous layer is extracted once with ether and the combined organic layers are washed with water, dried over magnesium sulfate and distilled. The N-[2-(N-carboxy-N-methylamino)-ethyl]-carbanilic acid diethyl ester, boiling point 142–146° C./0.2 mm., is obtained in 66% yield.

EXAMPLE II

*Preparation of N-[2-(N-Carboxy-N-Methylamino)-Ethyl]-p-Chlorocarbanilic Acid Diethyl Ester*

A solution of 55 parts of N-benzyl-N'-p-chlorophenyl-N-methylethlenediamine and 65 parts of ethylchloroformate in 250 parts of benzene is heated at reflux for 18 hours and cooled. The reaction mixture is shaken with dilute hydrochloric acid and the layers are separated. The aqueous layer is extracted with ether and the combined organic layers are washed with water, dried over magnesium sulfate and distilled. The N-[2-(N-carboxy-N-methylamino)-ethyl]-p-chlorocarbanilic acid diethyl ester, boiling point 158–165° C./0.2 mm., is obtained in 76% yield.

EXAMPLE III

*Preparation of N-[2-(N-Carboxy-N-Methylamino)-Ethyl]-p-Chlorocarbanilic Acid Dimethyl Ester*

The above compound, boiling point 150–155° C./0.3 mm., is obtained when methyl chloroformate is substi-

EXAMPLE IV

*Preparation of N-[2-(N-Carboxy-N-Methylamino)-Ethyl]-m-Chlorocarbanilic Acid Diethyl Ester*

The above compound, boiling point 158–183° C./0.1 mm., is obtained in 75% yield when N-benzyl-N'-m-chlorophenyl-N-methylethylenediamine is substituted for N - benzyl - N' - p - chlorophenyl - N - methylenediamine in the procedure described in Example II.

EXAMPLE V

*Preparation of N-[2-(N-Carboxy-N-Methylamino)-Ethyl]-m-Methylcarbanilic Acid Diethyl Ester*

The above compound, boiling point 148–152° C./0.3 mm., is obtained when N-benzyl-N-methyl-N'-m-tolylethylenediamine is substituted for N-benzyl-N'-p-chlorophenyl-N-methylethylenediamine in the procedure of Example II.

EXAMPLE VI

*Preparation of N-[2-(N-Carboxy-N-Methylamino)-Ethyl]-m-Methoxycarbanilic Acid Diethyl Ester*

The above compound, boiling point 160–165° C./0.1 mm., is obtained when N-benzyl-N'-m-methoxyphenyl-N-methylethylenediamine is substituted for N-benzyl-N' N-methylethylenediamine is substituted for N-benzyl-N'-p-chlorophenyl-N-methylethylenediamine in an experiment similar to that described in Example II.

EXAMPLE VII

*Preparation of N-[3-(N-Carboxy-N-Methylamino)-Propyl]-Carbanilic Acid Diethyl Ester*

The above compound, boiling point 154–158° C./0.2 mm., is obtained when N-benzyl-N-methyl-N'-phenyl-1,3-propanediamine is substituted for N-benzyl-N'-p-chlorophenyl-N-methylethylenediamine in a procedure similar to that of Example II.

EXAMPLE VIII

*Preparation of N-[2-(N-Carboxy-N-Methylamino)-1-Methylethyl]-Carbanilic Acid Diethyl Ester*

The above compound, boiling point 140–142° C./0.3 mm., is obtained when $N^1$-benzyl-$N^1$-methyl-$N^2$-phenyl-1,2-propanediamine is substituted for N-benzyl-N'-p-chlorophenyl-N-methylethylenediamine in the procedure described in Example II.

EXAMPLE IX

*Preparation of N-[2-(N-Carboxy-N-Methylamino)-Propyl]-Carbanilic Acid Diethyl Ester*

The above compound, boiling point 146–152° C./0.3 mm., is obtained in 79% yield when ethyl N-(2-benzylmethylaminopropyl)-carbanilate is substituted for N-(2-benzylmethylaminoethyl)-carbanilate in the process described in Example I.

EXAMPLE X

*Preparation of N-[2-(N-Carboxy-N-Methylamino)-Ethyl]-p-Bromocarbanilic Acid Diethyl Ester*

The above compound, boiling point 160–165° C./0.2 mm., is obtained when N-benzyl-N'-p-bromophenyl-N-methylethylenediamine is substituted for N-benzyl-N'-p-chlorophenyl-N-methylethylenediamine in the procedure of Example II.

EXAMPLE XI

*Preparation of N-[2-(N-Carboxy-N-Methylamino)-Ethyl]-m-Bromocarbanilic Acid Diethyl Ester*

The above compound, boiling point 170–175° C./0.2 mm., is obtained when N-benzyl-N'-m-bromophenyl-N-methylethylenediamine is substituted for N-benzyl-N'-p-chlorophenyl-N-methylethylenediamine in an experiment such as described in Example II.

EXAMPLE XII

*Preparation of N-[2-(Carboxy-N-Methylamino)-Ethyl]-p-Methoxycarbanilic Acid Diethyl Ester*

The above compound, boinling point 170–175° C./ 0.3 mm., is obtained when N-benzyl-N'-p-methoxyphenyl-N-methylethylenediamine is substituted for N-benzyl-N'-p-chlorophenyl-N-methylethylenediamine in the procedure of Example II.

We claim:

1. A compound of the formula:

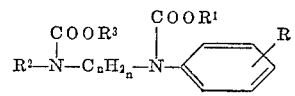

wherein R is a member of the group consisting of hydrogen, halogen, lower alkyl and methoxy, $R^1$, $R^2$ and $R^3$ are lower alkyl and $n$ is an integer of 2 to 3.

2. The compound N-[2-(N-carboxy-N-methylamino)-ethyl]carbanilic acid diethyl ester.

3. The compound N-[2-(N-carboxy-N-methylamino)-ethyl]-p-chlorocarbanilic acid diethyl ester.

4. The compound N-[2-(N-carboxy-N-methylamino)-ethyl]-p-chlorocarbanilic acid dimethyl ester.

5. The compound N-[2-(N-carboxy-N-methylamino)-ethyl]-m-chlorocarbanilic acid diethyl ester.

6. The compound N-[2-(N-carboxy-N-methylamino)-ethyl]-m-methylcarbanilic acid diethyl ester.

7. The compound N-[2-(N-carboxy-N-methylamino)-ethyl]-m-methoxy carbanilic acid diethyl ester.

8. The compound N-[3-(N-carboxy-N-methylaminopropyl]-carbanilic acid diethyl ester.

9. The compound N-[2-(N-carboxy-N-methylamino)-1-methylethyl]-carbanilic acid diethyl ester.

10. The compound N-[2-(N-carboxy-N-methylamino)-propyl]-carbanilic acid diethyl ester.

11. The compound N-[2-(N-carboxy-N-methylamino)-ethyl]-p-bromocarbanilic acid diethyl ester.

12. The compound N-[2-(N-carboxy-N-methylamino)-ethyl]-m-bromocarbanilic acid diethyl ester.

13. The compound N-[2-(N-carboxy-N-methylamino)-ethyl]-p-methoxycarbanilic acid diethyl ester.

References Cited in the file of this patent

UNITED STATES PATENTS 2,802,022    Groszos et al. _____ Aug. 6, 1957

FOREIGN PATENTS 879,251    France _____ Nov. 10, 1942